(12) United States Patent
Wessling et al.

(10) Patent No.: US 7,809,582 B2
(45) Date of Patent: Oct. 5, 2010

(54) SYSTEM AND METHOD FOR PROVIDING A CONSISTENT VISUAL APPEARANCE TO OUTPUT GENERATED BY MULTIPLE APPLICATIONS

(75) Inventors: Cynthia D. Wessling, Redmond, WA (US); David J. Siedzik, Seattle, WA (US); Juraj Gottweis, Bellevue, WA (US); Sumi N. Singh, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1609 days.

(21) Appl. No.: 11/076,780

(22) Filed: Mar. 10, 2005

(65) Prior Publication Data
US 2006/0206836 A1    Sep. 14, 2006

(51) Int. Cl.
*G06Q 99/00* (2006.01)
(52) U.S. Cl. ....................................................... 705/1.1
(58) Field of Classification Search ...................... 705/1
See application file for complete search history.

(56) References Cited

U.S. PATENT DOCUMENTS

| | | | |
|---|---|---|---|
| 7,231,602 B1 * | 6/2007 | Truelove et al. ............. | 715/205 |
| 7,366,974 B2 * | 4/2008 | Kalajian et al. ............. | 715/248 |
| 7,469,380 B2 * | 12/2008 | Wessling et al. ............. | 715/273 |
| 2001/0011287 A1 | 8/2001 | Goto et al. | |
| 2001/0045961 A1 | 11/2001 | Stoakley et al. | |
| 2002/0149618 A1 * | 10/2002 | Estrada et al. ............. | 345/760 |

FOREIGN PATENT DOCUMENTS

WO    WO9531773 A1    11/1995

OTHER PUBLICATIONS

European Search Report for European Application No. EP06110757 mailed on Nov. 2, 2007, 6 pgs.

* cited by examiner

*Primary Examiner*—Jonathan Ouellette
(74) *Attorney, Agent, or Firm*—Lee & Hayes, PLLC (57) ABSTRACT

The techniques and mechanisms described herein are directed to a method for creating an identity that defines a visual appearance for output generated by multiple applications. The identity may include a base design, an effects scheme, a color scheme, a font scheme, a logo, and business information. The identity being saved in a form that is accessible by the multiple applications so that when accessed, the application applies the identity to a document to give the document a consistent visual appearance with output from other applications.

14 Claims, 14 Drawing Sheets

SYSTEM AND METHOD FOR PROVIDING A CONSISTENT VISUAL APPEARANCE TO OUTPUT GENERATED BY MULTIPLE APPLICATIONS

TECHNICAL FIELD

This document generally relates to software applications, and more particularly, to output generated by the software applications.

BACKGROUND

Today, most businesses attempt to use a consistent visual appearance in all of their business materials, such as marketing materials, sales brochures, letterhead, website pages, and the like. By using a consistent visual appearance, businesses present a professional look to their customers. While large businesses may have the resources to provide this consistent visual appearance, smaller businesses may not necessarily have adequate resources to implement the consistent visual appearance.

For example, a small business may not have sufficient resources to hire a designer to create the consistent visual appearance. In addition, employees of the small business may not have the skills to create the consistent visual appearance for their output. Even if the small business could create or design a visual appearance for their output, the small business may have difficulty enforcing its use in all their business materials. Therefore, even though most small businesses may desire the professional look provided by a consistent visual appearance, small businesses often are unable to attain this professional look for their business materials.

SUMMARY

The techniques and mechanisms described herein are directed to a method for creating a customized, consistent visual identity that can be utilized by multiple applications to provide a consistent visual appearance to the output generated by the multiple applications. The identity may include a base design, an effects scheme, a color scheme, a font scheme, a logo, and business information. The identity may be saved in a form that is accessible by the multiple applications so that when it is accessed by one of these applications, the application applies the identity to a document to give the document a consistent visual appearance with output from other applications.

BRIEF DESCRIPTION OF THE DRAWINGS

Non-limiting and non-exhaustive embodiments are described with reference to the following figures, wherein like reference numerals refer to like parts through-out the various views unless otherwise specified.

DETAILED DESCRIPTION

Briefly, the present system and method is directed at creating a customized, consistent visual identity that can be utilized by multiple applications to provide a consistent visual appearance to the output generated by the multiple applications. This allows a user to create a "look" for output just once and have that "look" applied to all their output generated by various applications. Thus, small businesses may present a professional look to their customers. These and other advantages will become clear after reading the following detailed description.

Exemplary Computing Environment

Figure 1:
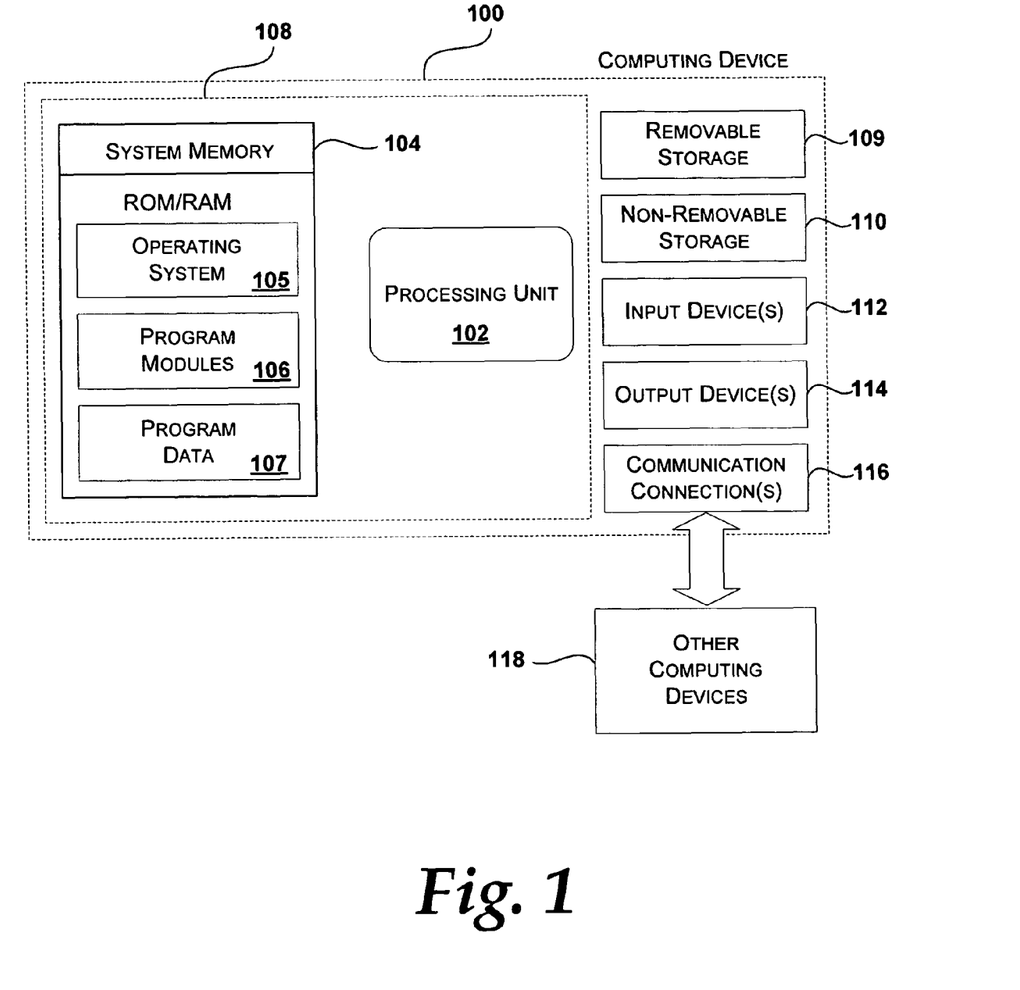
FIG. 1 is an illustrative computer environment that may be used to implement the techniques and mechanisms described herein.

The various embodiments of the mechanism for providing a consistent visual appearance may be implemented in different computer environments. Hereinafter, a consistent visual appearance may also be referred to as an "identity". The computer environment shown in FIG. 1 is only one example of a computer environment and is not intended to suggest any limitation as to the scope of use or functionality of the computer and network architectures. Neither should the computer environment be interpreted as having any dependency or requirement relating to any one or combination of components illustrated in FIG. 1.

With reference to FIG. 1, one exemplary system for implementing an identity mechanism includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer-readable instructions, data structures, program modules, or other data. System memory 104, removable storage 109 and non-removable storage 110 are all examples of computer storage media. Thus, computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well know in the art and need not be discussed at length here.

Computing device 100 may also contain communication connections 116 that allow the device to communicate with other computing devices 118, such as over a network. Communication connection(s) 116 is one example of communication media. Communication media may typically be embodied by computer-readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

Exemplary Identity Mechanism

Figure 2:
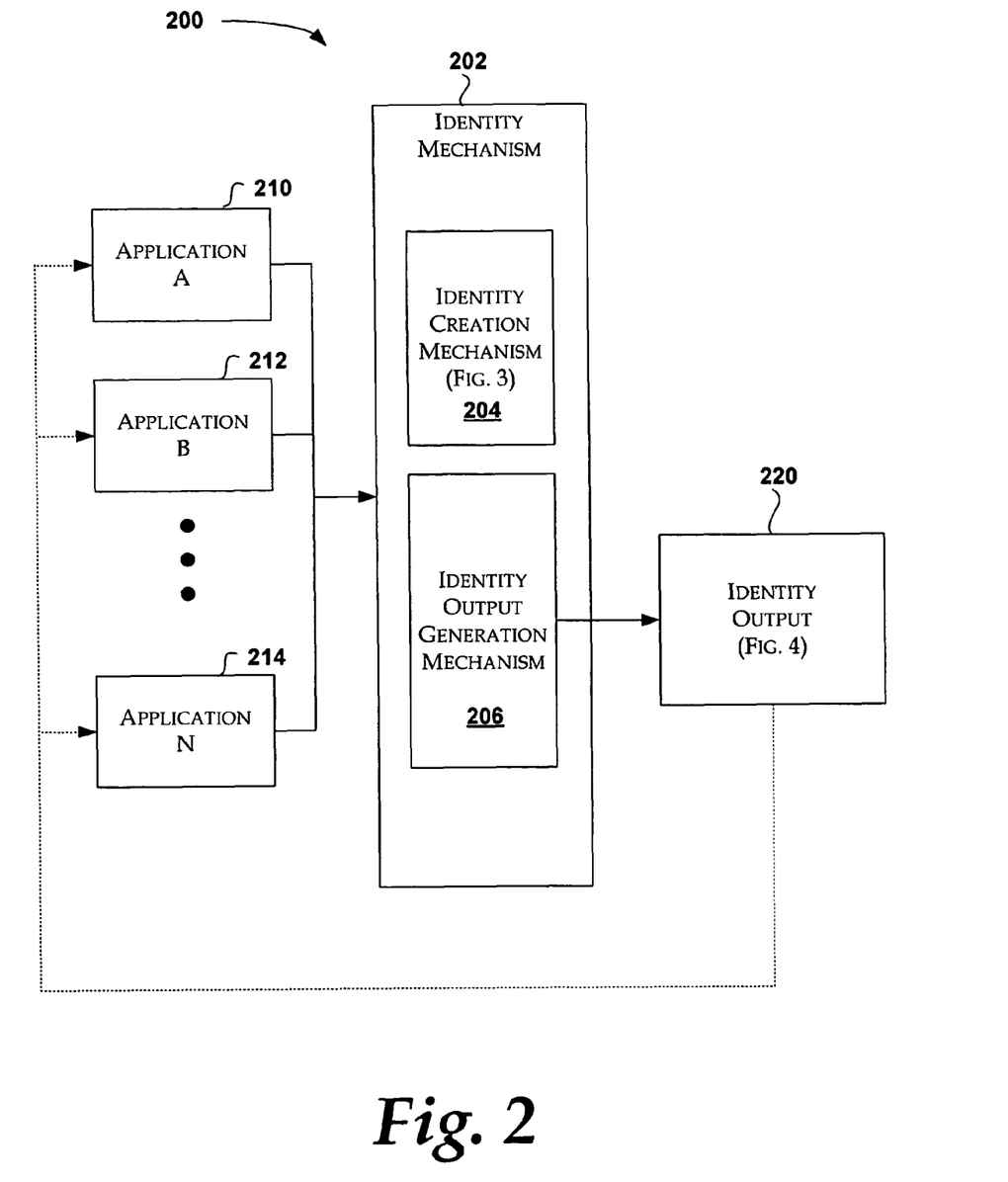
FIG. 2 is a block diagram illustrating an environment utilizing an identity mechanism as described herein.
Figure 5:
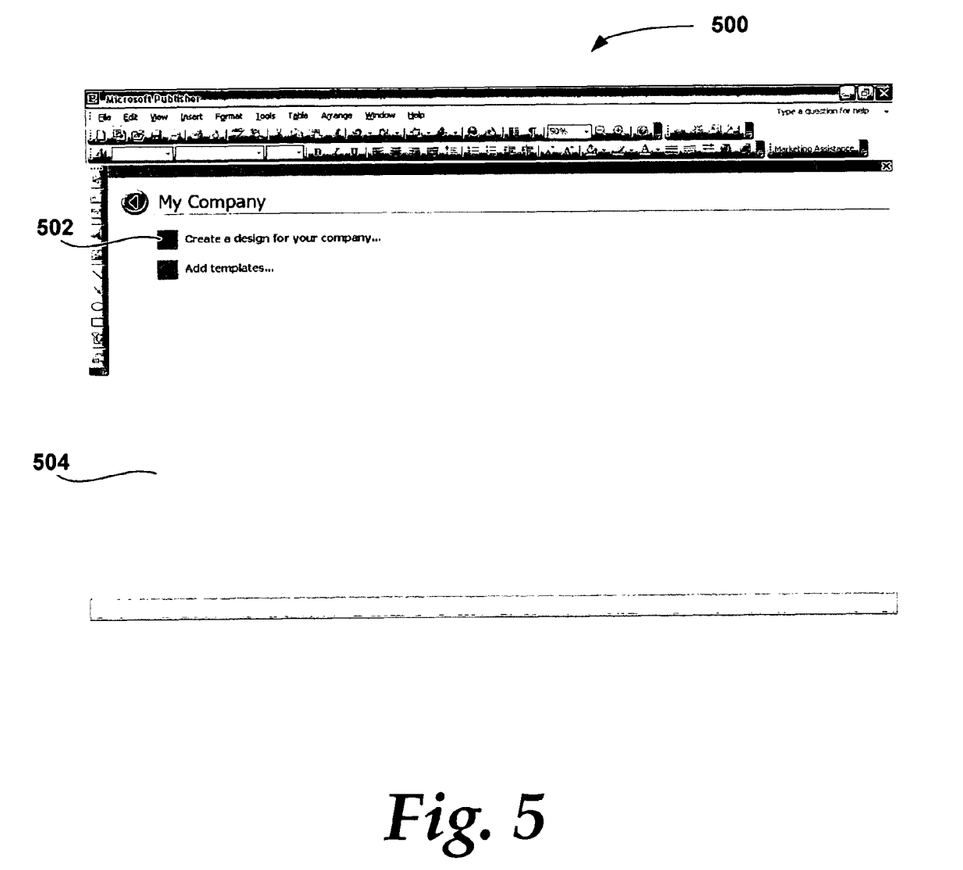
FIG. 5 is one embodiment of a display for accessing the identity mechanism from within an application to create an identity.

FIG. 2 is a block diagram illustrating an environment 200 in which the present identity mechanism 202 may operate. In one embodiment, the identity mechanism 202 may be one or more program modules 106 illustrated in FIG. 1. The identity mechanism 202 may be accessible to several applications, such as application 210 (e.g., Application A), application 212 (e.g., Application B), and application 214 (e.g., Application N). Each application 210-214 may be a different type of application. For example, application 210 may be a word processing application and application 212 may be a spreadsheet application. Each application 210-214 has an access point to the identity mechanism. For example, an access point for a word processing application may be dialog box that appears when creating a new document. A user may then either choose to by-pass the identity mechanism or choose to utilize the identity mechanism. In another example, a user may access the identity mechanism from an application menu item while working on an already-opened document. Briefly, turning to FIG. 5, one embodiment of an access point is illustrated. In this embodiment, the access point includes a link 502 on a blank document 504. A user may then activate the link 502 to access the identity mechanism. These and other variations for access points are envisioned for the present identity mechanism.

Referring back to FIG. 2, the identity mechanism 202 includes an identity creation mechanism 204 that allows an identity (not shown) to be defined from within one application. In one embodiment, illustrated in FIGS. 6-12, the identity creation mechanism may take the form of a series of graphical windows that provide a graphical user interface to a user. However, the identity creation mechanism may also take other forms, such as a text-based form. The identity mechanism 202 further includes an identity output generation mechanism 206. The identity output generation mechanism 206 utilizes the information that was input using the identity creation mechanism to generate an identity output 220. The identity output 220 is then available to the application within which the identity mechanism was accessed and to any of the other applications (represented by dotted lines from the identity output 220 to the applications 210-214). Any of the applications may then apply the identity to its output so that the output has a consistent visual appearance with output generated by other applications. Briefly, described in detail below in conjunction with FIG. 4, the identity output 220 may include templates, theme files, a business information store, and the like.

Figure 3:
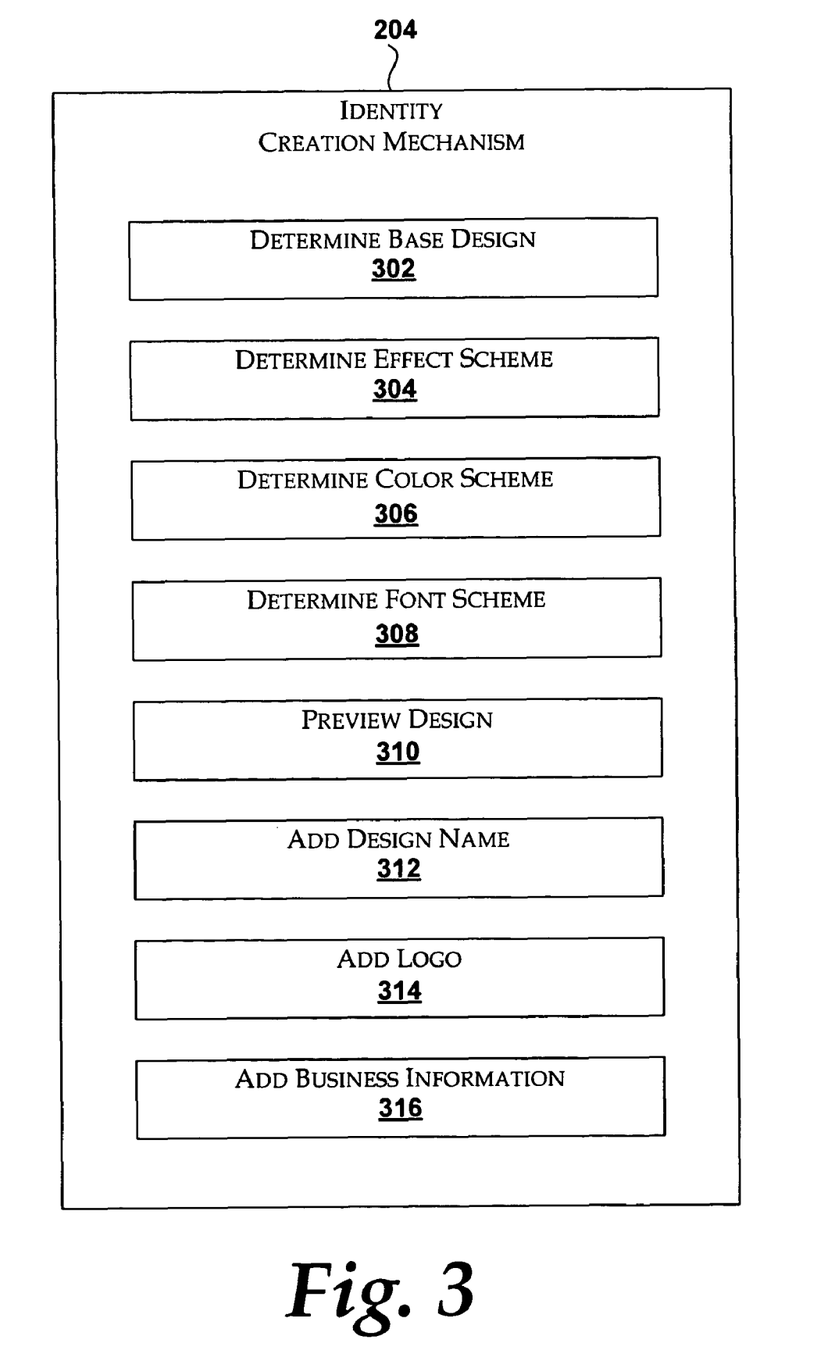
FIG. 3 is a block diagram illustrating one embodiment of the computer-executable modules within the identity mechanism illustrated in FIG. 2.

FIG. 3 illustrates one embodiment of the identity creation mechanism 204 having several program modules (i.e., modules 302-316). The modules 302-316 may be performed in various orders. In addition, certain modules may be omitted when creating the identity. Thus, a full or partial customization interface may be available to a user for creating and customizing an identity for a particular business.

As shown in FIG. 3, the identity creation mechanism 204 includes a module 302 for determining a base design. The base design represents the base layer design elements. For example, the base layer design elements may include a shape, such as a circle or square, used for visual design purposes. The base layer design elements may also include placeholders for a logo and business contact information. In addition, the base design includes information, such as layout, for each object on a page. The base layer design elements are incorporated into one or more templates for each application (e.g., a set of templates for the design) to which the identity can be applied. Therefore, module 302 may allow selection of an existing base design template or allow inserting base layer design elements onto a page which is then saved as a base design template. This set of templates then represents the base design for the identity.

The identity creation mechanism may also include module 304 for determining an effect scheme for the identity. In general, the effects scheme is a coordinated set of style elements that may be applied to base design elements to give them a particular style. In one embodiment, the effects scheme coordinates an element with up to four style choices. For example, a line element may have a choice of a thin line (e.g., style 1), a regular 1 point line (e.g., style 2), or a double line (e.g., style 3), or no line (e.g., style "null"). A line element in the base design may then specify what style (e.g., style 1, 2, \3 or null) to apply from the matrix. The benefit of using an effects scheme is that a different effects scheme may be easily switched to give the element a totally different look. The present identity mechanism allows a specific effects scheme to be defined as part of the identity In addition, the identity mechanism allows a specific interpretation of an effects scheme to be set as part of the identity when picking a base design in module 302.

The identity creation mechanism may also include module 306 for determining a color scheme for the identity. Color schemes are pre-defined sets of coordinated colors used to color design objects and text within the base design template. The selected color scheme is applied to templates and also is used to populate a section in each theme file. The color scheme may be saved as a set in an xml chunk and given a unique name.

The identity creation mechanism may also include module 308 for determining a font scheme for the identity. Font schemes are pre-defined sets of fonts that are used to style text within the base template. Typically, each pre-defined set includes two fonts, a primary font and a secondary font.

The identity creation mechanism may also include module 310 for illustrating one or more previews. A preview is a reduced-size image of a sample document to which the identity selections are applied. The preview sample document may be for the current application accessing the identity mechanism or from another application that uses the identity mechanism output.

The identity creation mechanism may also include module 312 for adding a design name to the identity. The design name is a unique name for the customized identity. The design name is used by the identity output generation mechanism 206 to create template names, file names, and theme names for other output. The design name is then available to a user for selecting an identity.

The identity creation mechanism may also include module 314 for adding a logo to the identity. The logo is typically any type of image file.

The identity creation mechanism may also include module 316 for adding business information to the identity. Business information may include an individual's name, an individual's job position, a company name, a phone number, and the like.

Once this identity is created, the identity output generation mechanism 206 shown in FIG. 2 generates identity output 220 based on the identity. The identity output is applicable to any number of applications. Thus, by creating the identity via the identity mechanism, the visual appearance needs only to be created once and then can be applied to the output of various applications.

Figure 6:
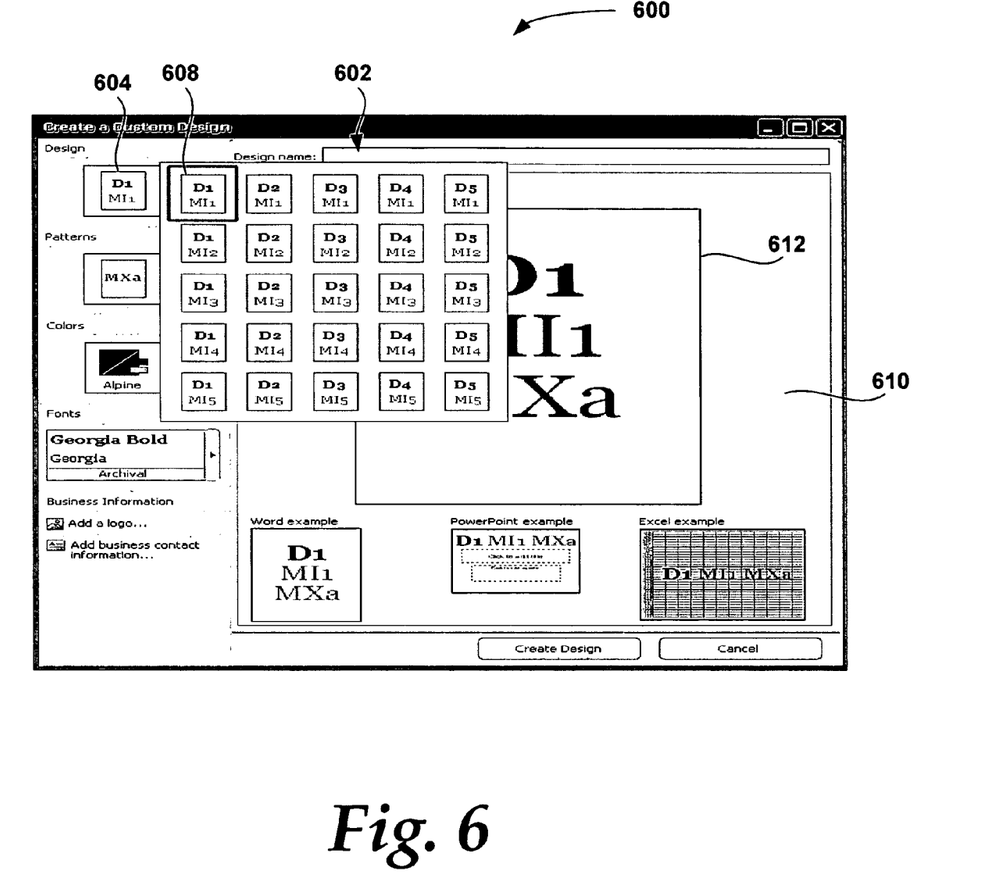
FIG. 6 is one embodiment of a display for selecting a base design for the identity.

An embodiment of a display for each of these modules 302-316 is now described. FIG. 6 illustrates a display 600 for selecting a base design for the identity. A design template drop-down menu 602 appears when a design link 604 is selected. The design template drop-down menu 602 illustrates several pre-defined design templates (e.g., design template 608). Each of the various design templates specifies a base design (e.g., $D_5$) and an applicable effects scheme interpretation (e.g., $MI_1$). Each design template is different from each other. By selecting one of the design templates, an enlarged view of the design template appears in the creation window 610. The enlarged design template 612 appearing in the creation window 610 visually displays the design elements associated with the design template. Thus, a user may easily determine whether the design template is desirable for the type of business output. Business output includes any type of document, such as websites, word processing documents, desktop publishing documents, spreadsheet documents, and the like.

Figure 7:
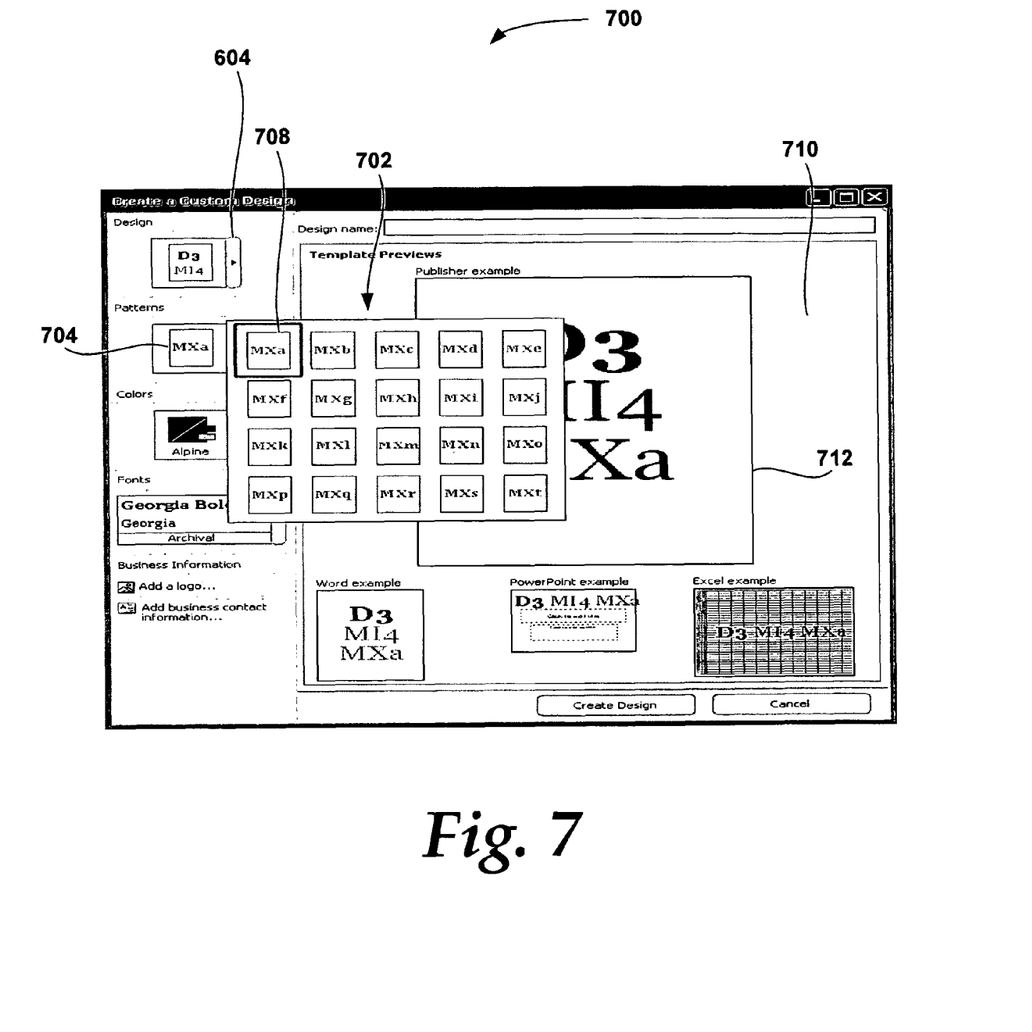
FIG. 7 is one embodiment of a display for selecting effects for the identity.

FIG. 7 illustrates a display 700 for determining an effects scheme for the identity. An effect scheme drop-down menu 702 appears when an effect scheme link 704 is selected. The effect scheme link 704 may be similar in appearance and functionality as the design link 604 shown in FIG. 6 and again in FIG. 7. Effect scheme link 704 may have a drop-down menu arrow on one side that drops down a menu when selected. The effect scheme drop-down menu 702 illustrates several effect schemes (e.g., effect scheme 708). Once one of the effect schemes is selected, an enlarged design view 712 appears in the creation window 710 that visually displays the results when the effects scheme is applied to the base design.

Figure 8:
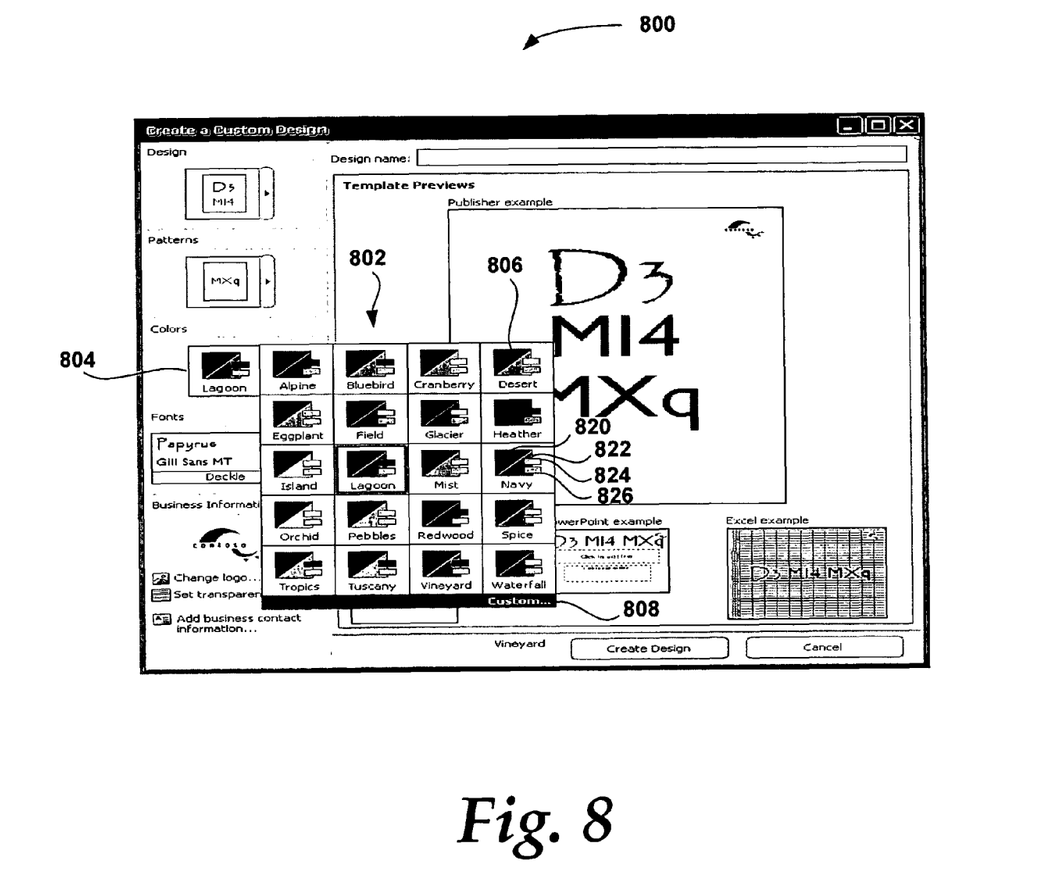
FIG. 8 is one embodiment of a display for selecting a color scheme for the identity.

FIG. 8 illustrates one embodiment of a display 800 for determining a color scheme for an identity. A color scheme drop-down menu 802 appears when a color scheme link 804 is selected. The color scheme drop-down menu 802 illustrates several pre-defined color schemes (e.g., Desert color scheme 806). Each color scheme has several slots (e.g., dark background 820, light background 822, accent color 1 824, accent color 2 826). Each slot is associated with a particular purpose within an application. While not shown in FIG. 8, there may be slots for specifying a color for hyperlinks, visited hyperlinks, and the like. In addition, a custom color scheme may be created by activating a custom link 808 on the color scheme drop-down menu 802. The custom color scheme option allows a specific color to be chosen for each slot of the color scheme and for the user to assign a name of their choosing to the color scheme. This is useful for when a business already has an existing set of colors that they want to use in their identity. Once the custom color scheme is defined, the custom color scheme may be added to the list of color schemes that appear when the color scheme link 804 is activated. The custom color scheme may be saved as an individual xml chunk and given a unique name. This allows the custom color schemes to be selected for use with an identity.

Figure 9:
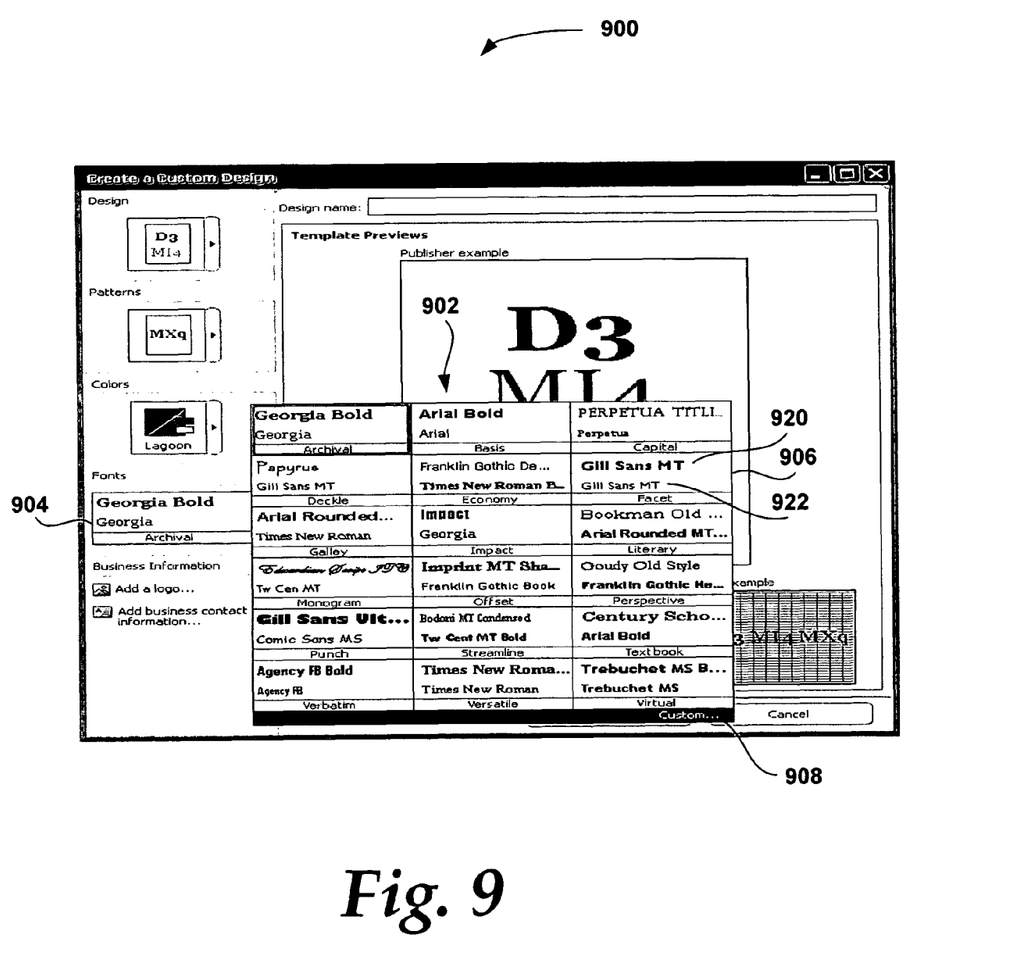
FIG. 9 is one embodiment of a display for selecting a font scheme for the identity.

FIG. 9 illustrates one embodiment of a display 900 for determining a font scheme. A font scheme drop-down menu 902 appears when a font scheme link 904 is selected. The font scheme drop-down menu 902 illustrates several pre-defined font schemes (e.g., Facet 906). Each font scheme includes a primary font 920 (e.g., bold Gill Sans MT) and a secondary font 922 (e.g., Gill Sans MT). In addition, a custom font scheme may be created by activating a custom link 908 on the font scheme drop-down menu 902. The custom font scheme option allows a specific font to be chosen as the primary font 920 and the secondary font 922 and allows the user to assign a name of their choosing to the font scheme. The custom font scheme may then be added to the list of font schemes that appear when the font scheme link 904 is activated. This allows the custom font schemes to be selected for use with an identity.

Figure 10:
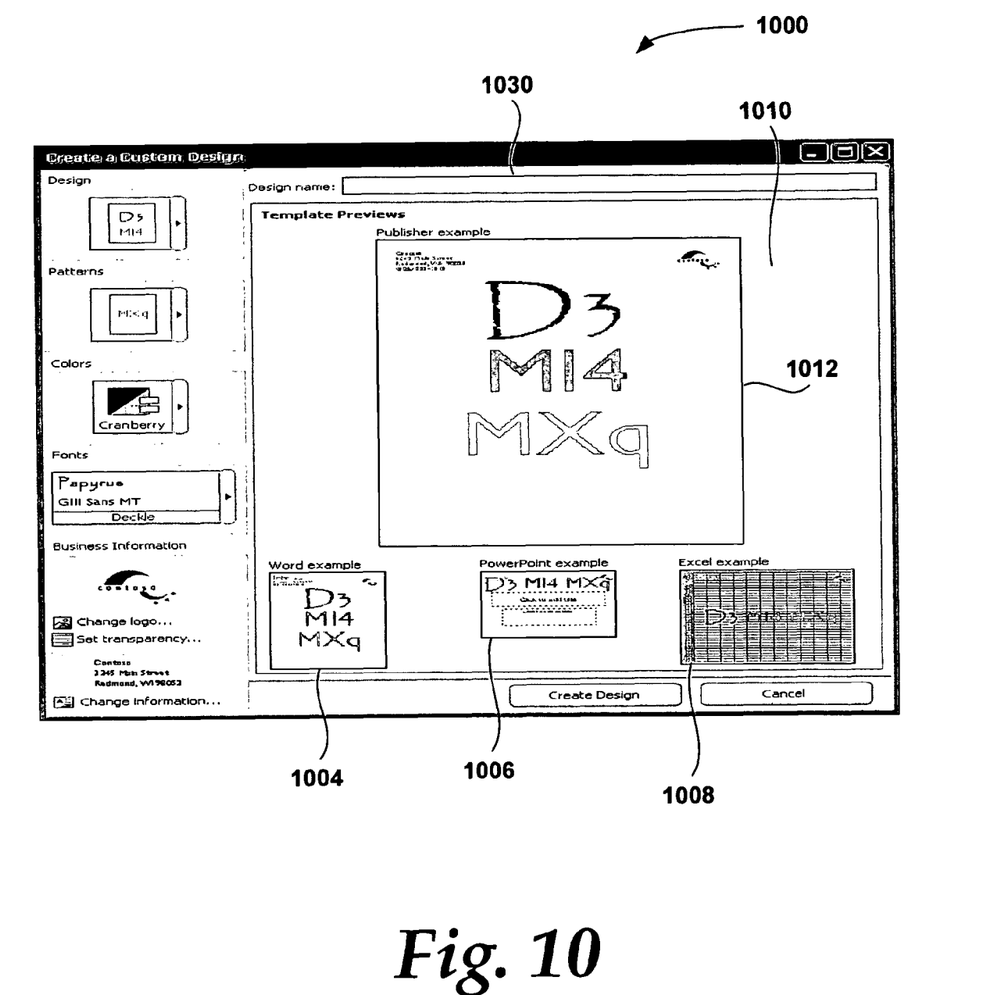
FIG. 10 is one embodiment of a display illustrating previews of the identity being applied to sample documents in other applications.

FIG. 10 illustrates one embodiment for displaying previews. For this embodiment, the current application utilizing the identity mechanism is a desktop publishing application. A create window 1010 will initially display an enlarged design template 1012 associated with the desktop publishing application. However, the current desktop publishing application may also view the impact of the selections for the identity on documents generated by other applications, such as a word processing application, a presentation application, a spreadsheet application, and the like. This allows a user to easily determine whether the selected options are desirable for all applications.

In one embodiment, the previews are rendered using object linking and embedding (OLE) technology. For example, from within the desktop publishing application, a preview of a sample document for a spreadsheet program may be viewed. FIG. 10 illustrates previews 1004, 1006, 1008, and 1012. Each of previews 1004, 1006, and 1008 illustrates a sample document in different applications. For each selection option (e.g., font, color), previews 1004-1012 will change to reflect the current identity. In another embodiment, the previews may each default to an icon which, upon selection, will display the actual sample document using the current identity. In another embodiment, users may view multiple templates from each application. For example, an Invoice template or a Mileage Log template for a spreadsheet application.

FIG. 10 also illustrates a text field 1030 for adding a design name to the identity. The design name is a unique name for the customized identity. The design name is used by the identity output generation mechanism 206 to create template names, file names, and theme names for other output. The design name is then available to a user for selecting an identity. The text field 1030 accepts a string representing the design name.

Figure 11:
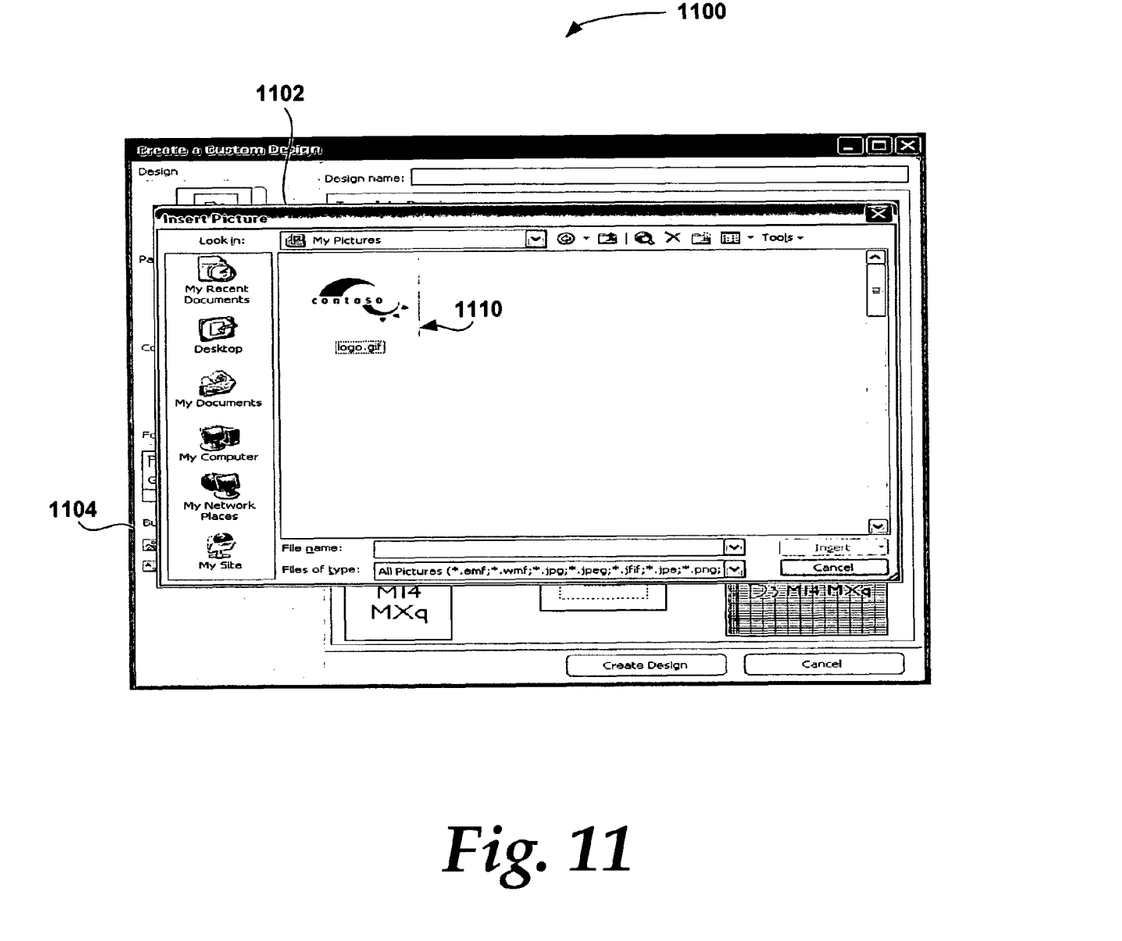
FIG. 11 is one embodiment of a display for inserting an image for the identity.
Figure 12:
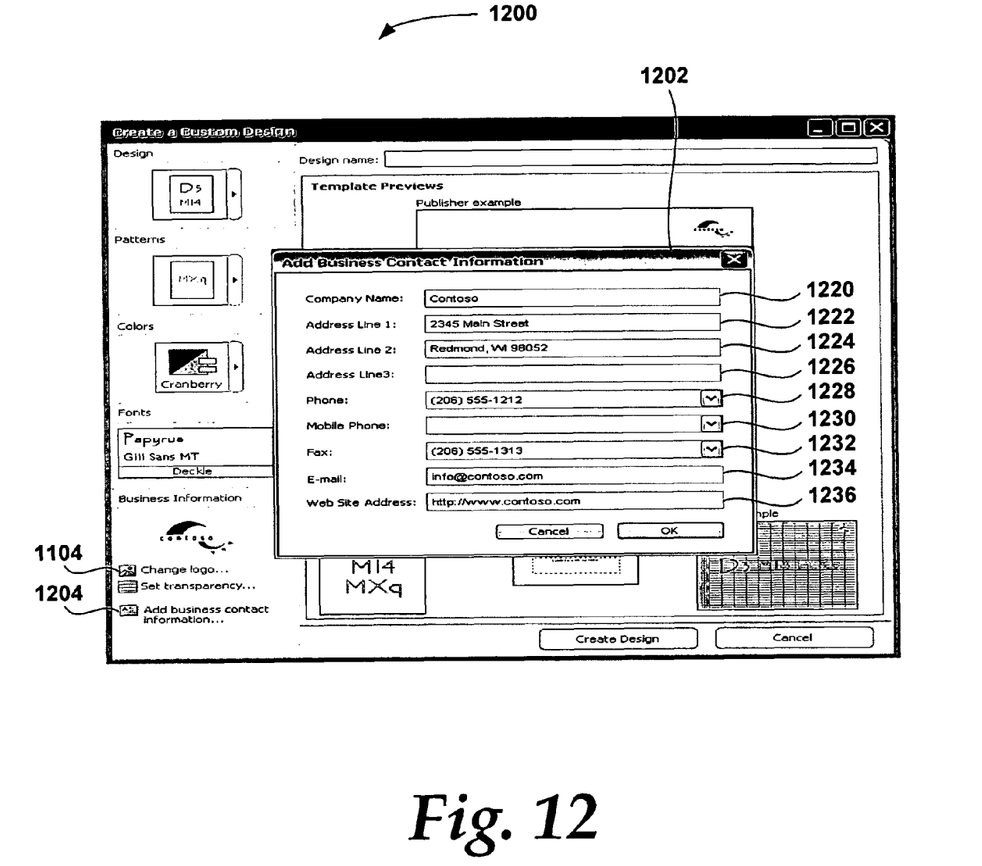
FIG. 12 is one embodiment of a display for adding business information to the identity.

FIG. 11 illustrates one embodiment for a display 1100 for adding an image. An insert picture window 1102 appears when a change logo link 1104 is selected. The change logo link 1104 is also illustrated in FIG. 12. The insert picture window 1102 allows a user to browse files in search of an image file. Once an image file is located (e.g., image 1110), the image is selected and is then included as part of the identity.

FIG. 12 illustrates one embodiment of a display 1200 for adding business information. A business contact information window 1202 appears when a business contact information link 1204 is selected. The business contact information window 1202 may include a text box for an individual's name (not shown), an individual's job position (not shown), a company name 1220, a company tagline (not shown), a phone number 1228, a fax number 1232, a mailing address 1222-1226, a web site address 1236, an email address 1234, and the like.

It is important to note, that in one embodiment, when one of the various design options (e.g., font scheme, color scheme, effects scheme) is modified, the associated display will show the output with the newly modified design option applied. In addition, the output will also have all the other design options applied to it. Thus, the display shows the cumulative affect of all the design options.

Figure 13:
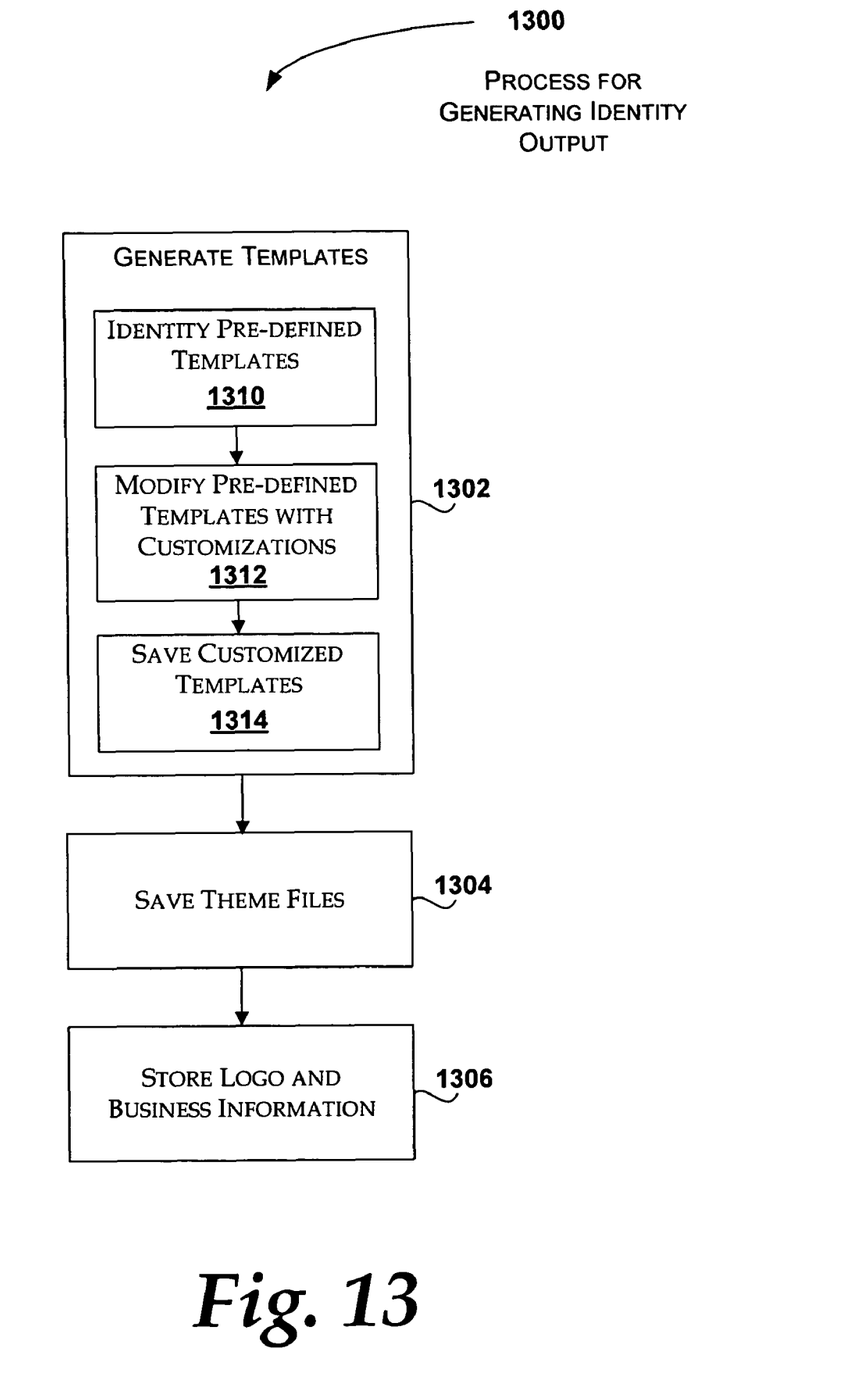
FIG. 13 is a flow diagram illustrating a process for generating the identity output generated by the identity mechanism.

FIG. 13 illustrates one embodiment of a process 1300 for generating identity output. At block 1302, the process 1300 generates templates. When generating the templates, the identity output generation mechanism identifies pre-defined templates at block 1310. As mentioned earlier, during the creation process, a base design is selected. The base design is associated with pre-defined templates for each application configured to use the identity. Typically, the pre-defined templates are stored locally or remotely when the identity mechanism is installed. At block 1312, the pre-defined templates are modified with the customizations selected during the identity creation process described above. Placeholders within the pre-defined template are replaced with the content specified within the identity. For example, the pre-defined template may have a placeholder for a business name, business address, logo, and the like. Thus, the effects scheme, color scheme, font scheme, optional logo image, and optional business contact information is applied to the predefined template to create a customized template. At block 1314, the customized template is saved. If a user-entered design name was entered during the creation process, that design name may be used when saving the customized templates into the appropriate directories for each application. These customized templates may then appear when the corresponding application interface is invoked. The customized templates may be stored in the same directory as the pre-defined templates or in a different directory. In addition, each template in the set of templates for a specific identity may be stored in a different directory associated with the applicable application.

At block 1304, the process 1300 saves theme files. In one embodiment, theme files may be XML containers that contain information used to add style to documents. Using the selections during the creation process, the identity output generation mechanism adds the color scheme, font scheme, effects scheme, optional logo image, and optional business contact information to a theme file. In addition, application specific information may be added to the theme file. The themes may then be utilized by the applications in their own specific manner. For example, the themes may be chunks in a header of a file. In any implementation, the objects and placeholders within a document reference the theme in order to apply the style to the document. The theme portion may be easily swapped out with another theme to give the document a totally different look.

At block 1306, the process 1300 stores the logo image and the business information, if there is any. The process may store this in the user's registry settings, metadata, XML file, a theme file, or the like. It is desirable to store the image and information so that other application interfaces may access and edit the image and information as needed.

Figure 4:
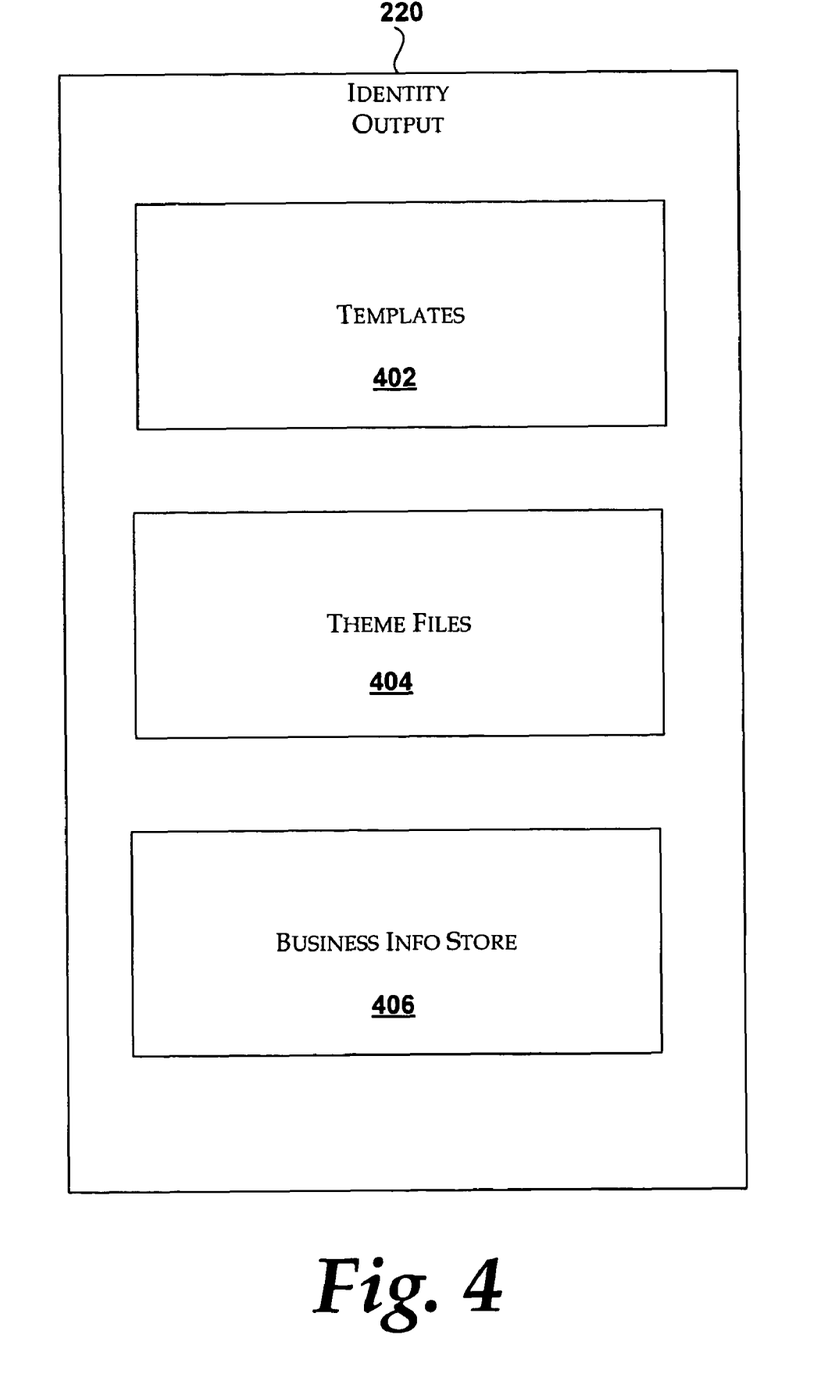
FIG. 4 is a graphical depiction of identity output generated by the identity mechanism illustrated in FIG. 2
Figure 14:
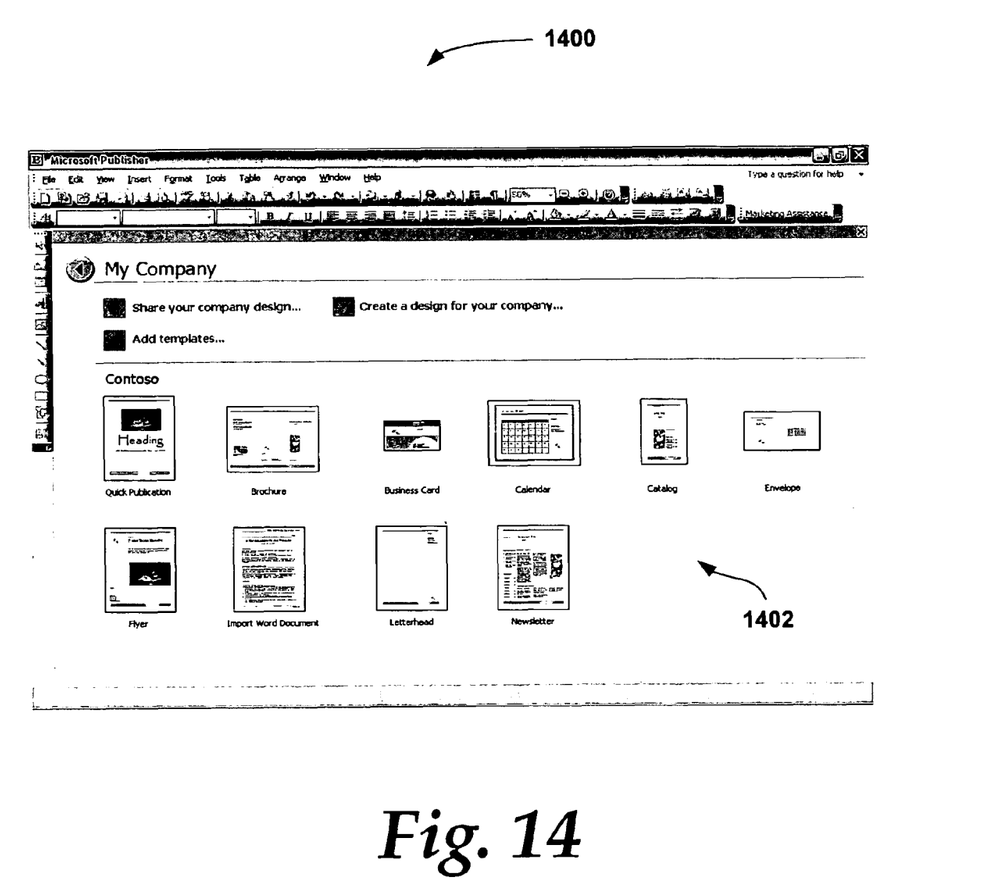
FIG. 14 is one embodiment of a display illustrating identity output generated by the identity mechanism.

FIG. 4 illustrates the identity output 220 generated by the identity output generation mechanism 206 illustrated in FIG. 2. As mentioned earlier, identity output 220 includes templates 402, theme files 404, and a business information store 406. While FIG. 4 illustrates business information store 406, as mentioned above, the identity output generation mechanism 206 may store the logo with business contact information in a user's registry or the like or within the theme files 404. FIG. 14 illustrates one embodiment of a display 1400 showing the resulting templates 1402 for a desktop publishing application.

Thus, by using the present identity mechanism, a small business may create a "look" for their business material that will get propagated to output of various applications. The identity mechanism allows the user to view the effects of the choices not only in the current application, but also in other applications through the use of previews. Using the present identity mechanism, the small business may conveniently create a professional look for all their business materials.

While FIGS. 5-12 illustrate one embodiment of a user interface for the present identity mechanism, the user interface may also use other graphical elements to provide the same underlying functionality. In fact, it is envisioned that the user interface may appear differently in different applications.

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the visual appearance mechanism may be practiced without one or more of the specific details, or with other methods, resources, materials, etc. In other instances, well known structures, resources, or operations have not been shown or described in detail merely to avoid obscuring aspects of the present consistent visual appearance technique.

While example embodiments and applications have been illustrated and described, it is to be understood that the visual appearance technique is not limited to the precise configuration and resources described above. Various modifications, changes, and variations apparent to those skilled in the art may be made in the arrangement, operation, and details of technique disclosed herein without departing from the scope of the claimed invention. Thus, as described, the present visual appearance technique allows users to create an identify once and apply that identity within various applications to achieve a consistent visual appearance in the output of the various applications.

What is claimed is:

1. One or more computer-readable media encoded with computer-executable instructions for performing a method comprising:
    displaying a user-interface for creating an identity that defines a visual appearance, the identity being available to each of a plurality of applications to generate a consistent visual look for output generated by the respective application, wherein displaying the user-interface occurs upon creation of a new document in the application and when a menu item is selected while editing a document in the application;
    receiving a menu entry selection signal in response to a user interface selection device selecting one of a plurality of menu selections of the user-interface;
    modifying the identity based on the menu entry selection signal; and
    displaying a plurality of previews simultaneously, wherein each of the plurality of previews displays output generated by each respective application after having applied the identity that defines the visual appearance.

2. The computer-readable media of claim 1, wherein the menu selection comprises a color scheme option.

3. The computer-readable media of claim 1, wherein the menu selection comprises a font scheme option.

4. The computer-readable media of claim 1, wherein the menu selection comprises a base design option, the base design defining one or more objects and defining a position for the one or more objects in the output.

5. The computer-readable media of claim 1, wherein the menu selection comprises an effects scheme option, the effects scheme defining a coordinated set of style elements.

6. The computer-readable media of claim 1, wherein the menu selection comprises a logo option.

7. The computer-readable media of claim 1, wherein the menu selection comprises a business information option.

8. The computer-readable media of claim 1, wherein the user-interface includes a save option that when selected saves the identity in a template.

9. The computer-readable media of claim 1, wherein the user-interface includes a save option that when selected saves the identity as a theme.

10. The computer-readable media of claim 1, wherein the menu selection comprises a business information option and the user-interface includes a save option that when selected saves business information entered in response to the business information option selection to a business information store.

11. A computer-implemented method comprising:
    storing, in a memory, instructions for performing the method;
    executing the instructions on a processor;
    according to the instructions being executed:
        applying an identity to output of an application, the identity defining a visual appearance for the output, the visual appearance of the output being consistent with respective other output generated by other applications that have applied the identity to their respective other output, wherein the identity comprises:
            a color scheme, wherein the color scheme comprises pre-defined sets of coordinated colors used to color design objects and text;
            a font scheme, wherein the font scheme comprises pre-defined sets of fonts used to style text, wherein each pre-defined set comprises a primary font and a secondary font;
            a logo;
            an effect scheme, wherein the effect scheme comprises a coordinated set of style elements; and
            business information;
        displaying a plurality of previews simultaneously, wherein each of the plurality of previews displays output generated by each respective application after having applied the identity that defines the visual appearance, wherein each preview comprises a reduced-sized image of a sample document to which the identity is applied, wherein the previews are rendered using object linking and embedding (OLE) technology; and
        generating the output based on the identity.

12. The computer-implemented method of claim 11, wherein the identity is saved within a plurality of templates, each template being associated with one of the applications.

13. A system configured to provide a consistent visual appearance to output generated by a plurality of applications, the system comprising:
    a processor; and
    a memory into which a plurality of instructions are loaded, the plurality of instructions comprising:
        an identity creation module configured to create an identity that defines a customized visual appearance for output generated by the plurality of applications;
        a preview module configured to display a plurality of previews simultaneously, wherein each of the plurality of previews displays output generated by each respective application after having applied the identity that defines the customized visual appearance, wherein each preview comprises a reduced-sized image of a sample output to which the identity is applied; and
        an identity output generation module configured to save the identity in a form accessible by the plurality of applications.

14. The system of claim 13, further comprising a module for applying the identity to the output of the plurality of applications.

* * * * *